US009746373B2

(12) United States Patent
Oh et al.

(10) Patent No.: US 9,746,373 B2
(45) Date of Patent: Aug. 29, 2017

(54) APPARATUS FOR DETECTING PHOTON IN ACCORDANCE WITH ATMOSPHERIC CONDITION USING FUNCTION OF ADJUSTING LIGHT QUANTITY, AND METHOD OF ADJUSTING LIGHT QUANTITY

(71) Applicant: National Institute of Meteorological Sciences, Seoul (KR)

(72) Inventors: Young Suk Oh, Chungcheongbuk-do (KR); Tae Young Goo, Jeju-do (KR); Jin Ho Shin, Jeju-do (KR); Jong Ho Lee, Seoul (KR); Kyu Sun Chung, Gangwo-do (KR); Bok Haeng Heo, Daejeon (KR)

(73) Assignee: NATIONAL INSTITUTE OF METEOROLOGICAL SCIENCES, Jeju-Do (KR)

(*) Notice: Subject to any disclaimer, the term of this patent is extended or adjusted under 35 U.S.C. 154(b) by 165 days.

(21) Appl. No.: 14/939,309

(22) Filed: Nov. 12, 2015

(65) Prior Publication Data
US 2016/0223399 A1 Aug. 4, 2016

(30) Foreign Application Priority Data

Feb. 4, 2015 (KR) .................. 10-2015-0017329
Mar. 17, 2015 (KR) .................. 10-2015-0036533

(51) Int. Cl.
*G01J 3/02* (2006.01)
*G01W 1/00* (2006.01)
(Continued)

(52) U.S. Cl.
CPC ............. *G01J 3/0232* (2013.01); *G01J 1/044* (2013.01); *G01J 1/0437* (2013.01); *G01J 1/26* (2013.01); *G01J 3/0275* (2013.01); *G01W 1/00* (2013.01)

(58) Field of Classification Search
CPC ........ G01J 3/0232; G01J 3/0275; G01W 1/00
(Continued)

(56) References Cited

U.S. PATENT DOCUMENTS 5,930,021 A * 7/1999 Matsubara ............ G02F 1/0327
                                                             347/136
2010/0039641 A1* 2/2010 Park ........................ G01J 3/02
                                                             356/310

FOREIGN PATENT DOCUMENTS

JP       1994-186080 A     7/1994
JP       3038810            3/2000
(Continued)

*Primary Examiner* — Seung C Sohn
(74) *Attorney, Agent, or Firm* — Dentons US LLP

(57) ABSTRACT

The present invention relates to an apparatus for detecting photons according to an atmospheric condition, using a function of adjusting light quantity that can significantly improve reliability of an atmospheric condition analysis result by minimizing noise in a spectrum by maintaining the quantity of incident light uniform within a predetermined range regardless of atmospheric conditions and changes, and to a method of adjusting light quantity. The apparatus for detecting photons in accordance with atmospheric conditions using a function of adjusting light quantity includes: an apparatus case having a light inlet; a light quantity adjuster disposed under the light inlet and adjusting quantity of incident light such that a predetermined quantity of light travels inside; and a controller controlling operation of the light quantity adjuster in accordance with intensity of light detected by the light quantity adjuster.

11 Claims, 12 Drawing Sheets

(51) Int. Cl.
*G01J 1/04* (2006.01)
*G01J 1/26* (2006.01)
(58) Field of Classification Search
USPC .......................................... 250/205; 356/328
See application file for complete search history.

(56) References Cited

FOREIGN PATENT DOCUMENTS

| | | |
|---|---|---|
| JP | 2002-148675 A | 5/2002 |
| JP | 2010-251387 A | 11/2010 |
| KR | 10-2000-0015251 | 3/2000 |
| KR | 0587479 | 5/2006 |
| KR | 1465694 | 11/2014 |

\* cited by examiner

APPARATUS FOR DETECTING PHOTON IN ACCORDANCE WITH ATMOSPHERIC CONDITION USING FUNCTION OF ADJUSTING LIGHT QUANTITY, AND METHOD OF ADJUSTING LIGHT QUANTITY

BACKGROUND OF THE INVENTION

Field of the Invention

The present invention relates to a method of detecting and analyzing light including sunlight. More particularly, the present invention relates to a method of showing differences in photons in electric signals in accordance with the condition and characteristic of the atmosphere using sunlight traveling through the atmosphere and adjusting light quantity such that the quantity of incident light is maintained uniform. The present invention makes it possible to considerably improve observation accuracy by making it possible to adjust observation equipment within a short time in sensitive response to a change in light quantity. Further, the present invention relates to an apparatus for detecting photons according to an atmospheric condition, using a function of adjusting light quantity that can significantly improve reliability of an atmospheric condition analysis result by minimizing noise in a spectrum by maintaining light quantity uniform within a predetermined range regardless of atmospheric conditions and changes, and to a method of adjusting light quantity.

Description of the Related Art

Observing the atmosphere can be considered as a typical way of detecting and analyzing photons in the atmosphere and an FTS (Fourier Transform Spectrometer) can be considered as a typical analysis device for observing the atmosphere.

An FTS receives sunlight through the atmosphere and then divides the sunlight traveling through the atmosphere, using an interferometer such as a Fabry-perot interferometer and a Michelson interferometer. The FTS, thereafter, produces an interference pattern by recombining the divided sunlight rays to generate optical path differences that form the interference pattern. The interference pattern is detected by an optical detection system in the FTS and is transformed into an absorption spectrum showing wavelength absorbance at each frequency by Fourier transform. The absorption spectrum has mechanism information relating to interactions between light and substances, depending on differences in peak width, depth, and gap. Accordingly, the FTS makes it possible to observe distribution of substances absorbing corresponding frequencies in the atmosphere by detecting whether specific frequency components are absorbed, by detecting and then analyzing light in the atmosphere.

Further, the FTS includes an optical sensor as a photoelectric transformer that transforms sunlight into electric signals.

In the related art, as examples of the FTS described above, there are Korean Patent Application Publication No. 10-2000-0015251 (Patent Document 1), titled "light path difference generator using two couples of flat mirrors for Michelson interferometer for Fourier transformed spectroscopy and Japanese Patent No. 3038810 (Patent Document 2), titled "observation spectrometer". Further, as examples of the optical sensor that transforms sunlight into electric signals in the FTS, there are a ultraviolet LED as an optical sensor in a ultraviolet index measuring apparatus disclosed in Korean Patent No. 10-1465694 (Patent Document 3) and a optic sensor for an automobile that makes it possible to control temperature and light in accordance with areas in a vehicle depending on the direction of sunlight by detecting sunlight using two optical diodes disclosed in Korean Patent No. 10-0587479 (Patent Document 4).

The FTSs and optical sensors in the related art are used to detect characteristics of the atmosphere by transforming an optical signal of an interference pattern detected by photoelectric transformation, producing a spectrum by dividing the transformed electric signal for each wavelength through Fourier transform, and then analyzing the spectrum.

However, the devices of Patent Documents 1 and 2 are used to detect characteristics of the atmosphere by producing an interference pattern by interfering with incident light with an optical interferometer, transforming the optical signal of the interference pattern detected through optical transformation, and dividing the electric signal for each wavelength through Fourier transform. That is, since the devices do not transform incident light directly into an electric signal, but transform light into an electric signal by producing an optical interference pattern and the perform Fourier transform, an interferometer is needed and the configuration of a light receiving unit is complicated.

Further, the optical sensors disclosed in Patent Document 3 and 4 sense light using an LED, so they can provide a technique capable of blocking diffused light except for light to be observed, and accordingly, efficiency of light sensing and accuracy in analysis result are low.

Further, since the light quantity depends on the incident direction of light to be observed such as sunlight, measurement signal values of light in the atmosphere are variable, so accurate measurement is impossible. That is, the quantity of sunlight traveling into the FTSs or the photoelectron conduction tip depends on the condition of the atmosphere or the time of measurement. Even if the quantity of sunlight is in a variable range, that is, a predetermined range, when intensive light temporarily travels into the FTSs or when light rapidly appears in accordance with the conditions of the atmosphere, the FTSs cannot temporarily read the intensity value of sunlight. This phenomenon deteriorates reliability of observed data by acting as noise in a spectrum.

In the related art, there is a device called a cam that measures light quantity in an FTS. The cam sets an area, shows sun intensity by marking dots, which indicate how much light travels in the area, and then showing the distribution of the dots. Accordingly, it is possible to obtain information about sun intensity in real time, but it is impossible to adjust a difference in sun intensity.

Further, in the related art, there U.S. Patent Application Publication No. 2010-0039641 (Patent Document 5, published on 18 Feb., 2010), which discloses 'a micro-ring spectrometer having an adjustable opening' that makes it possible to adjust light quantity by selecting a frequency using an adjusting plate of which the focal distance can be adjusted, but it also cannot provide a technique making light quantity uniform in accordance with time and conditions of the atmosphere and a configuration for improving measurement reliability of an FTS.

PRIOR ART DOCUMENT

Patent Document 1: Korean Patent Application Publication NO. 10-2000-0015251

Patent Document 2: Japanese Patent No. 10-3038810

Patent Document 3: Korean Patent No. 10-1465694

Patent Document 4: Korean Patent No. 10-0587479

Patent Document 5: U.S. Patent Application Publication No. 2010-0039641

SUMMARY OF THE INVENTION

Accordingly, the present invention has been made keeping in mind the above problems occurring in the related art, and the present invention is intended to propose an apparatus for detecting photons according to conditions of the atmosphere using a function of adjusting light quantity that can keep the quantity incident sunlight uniform such that the quantity of light traveling into a photoelectron conduction tip in an FTS can be kept uniform in a predetermined range regardless of changes in time or condition of the atmosphere, and a method of adjusting light quantity.

Further, the present invention provides an apparatus for detecting photons according to conditions of the atmosphere using a function of adjusting light quantity that can increases the ratio of signals by light to be measured in light signals to be analyzed by blocking light that is noise such as diffused light except for light to be measured, that makes it possible to obtain photoelectrons generated by a work function of sunlight without a loss, that can considerably improve reliability in analysis when the atmosphere is analyzed by transforming sunlight into an electric signal, and that makes it possible to significantly reduce the size of a spectrometer by making it possible to divide sunlight directly into an electric signal to analyze it, and a method of adjusting light quantity.

In order to achieve the above object, according to one aspect of the present invention, there is provided an apparatus for detecting photons in accordance with atmospheric conditions using a function of adjusting light quantity. The apparatus includes: an apparatus case having a light inlet; a light quantity adjuster disposed under the light inlet and adjusting quantity of incident light such that a predetermined quantity of light travels inside; and a controller controlling operation of the light quantity adjuster in accordance with intensity of light detected by the light quantity adjuster.

The light quantity adjuster may include: a light sensor unit including one or more optical sensors for detecting intensity of light; an optical shutter unit changing a diameter of an opening such that a predetermined quantity of light travels inside; and a shutter actuating unit controlled by the control unit to open and close the optical shutter unit.

The optical shutter unit may include: a rotary ring having actuating pins symmetrically arranged, and having a shutter actuating rod hole in which an end of the shutter actuating rod is hinged-coupled; and optical shutters including a plurality of shutters that has an oblong hole in which the actuating pins are inserted and are rotatably arranged with regular intervals around the opening to increase or decrease the diameter of the opening in accordance with rotational directions of the rotary ring.

The diameter of the opening formed by the optical shutters may be adjusted in a range of 26 to 32Φ (mm) in accordance with a rotational angle of the rotary ring, and the optical shutters may uniformly maintain a quantity of incident light with a difference of 1 (px*ms) or less. Since the diameter is adjusted within the range of 26 to 32Φ (mm), sunlight is stably transmitted to an FTS and there is no saturation according to intensity of light. Accordingly, only optical signals within a predetermined range for producing a spectrum are obtained.

The shutter actuating unit may include: a stepping motor controlled by the controller; a screw bolt coupled to a shaft of the stepping motor; and a shutter actuating rod having a first end rotatably coupled to the screw bolt and a second end inserted in the shutter actuating rod hole of the rotary ring to rotate the rotary ring, and rotating the rotary ring with rotation of the screw bolt.

The controller may operate the optical shutters at 30 Hz or more and controls the shutter actuating unit such that the diameter is changed by 1Φ (mm) when the optical shutters adjust the opening in a single step. Since the optical shutters are operated at 30 Hz (1/s) or more, a change rate of light quantity according to a change in size of the opening is minimized, so there is no influence on optical analysis of the FTS. The controller is a component for stably supplying a predetermined quantity of light according to an object of the present invention.

The apparatus may further include a photon detector that includes: a photon detector case assembly having a light inlet at one end, having a crystal transparent window that transmits only light having an incident light within a predetermined range with respect to a direction perpendicular to the light inlet, an sealed to prevent inflow of dispersed light or noise light; a photoelectric transformer having a photoelectron conduction tip that generates photoelectrons from light traveling inside through the light inlet of the photon detector case and sending the photoelectrons to a signal wire assembly; and the signal wire assembly coupled to the photoelectric transformer and outputting the photoelectrons generated by the photoelectron transformer to the outside for analysis, and that is disposed under the light quantity adjuster and generates and outputs photoelectrons from light traveling inside through the optical shutters.

The transparent window may be a crystal window selectively transmitting light in accordance with angles.

The photon detector case assembly may include: an upper case unit including a cylindrical upper case that has a light inlet having an inner diameter smaller than the outer diameter of the transparent window to support the edge of the top of the transparent window, with the edge of the light inlet functioning as a transparent window support flange and the bottom open; a body case unit including a body case that has a top open with an inner diameter smaller than the inner diameter of the outer wall, has an insulating cover-upper support flange having a transparent window sealer groove, in which a transparent window sealer is seated, formed downward along the top around the opening, in which the outer wall extends downward from the outer side of the insulating cover-upper support flange and the bottom is open to be coupled to the lower portion of the upper case unit; and a base case unit including a base case that is coupled to the bottom of the body case unit and fixes and supports the photoelectric transformer and a signal wire assembly to output photoelectrons generated by the photoelectric transformer to a spectrometer through signal wires.

The photoelectric transformer may include: an insulating cover coupled to the outer side of the photoelectron conduction tip and insulating the photoelectron conduction tip and the photon detector case unit from each other; a conductive plate coupled to bottoms of the insulating cover and the photoelectron conduction tip and carrying photoelectrons, which are generated by the photoelectron conduction tip and collected around the bottom of the photoelectron conduction tip, to signal wires; and an insulating base having a vacuum nut hole at a center, in which a vacuum nut is seated and through which the signal wires are inserted, and supporting a bottom of the conductive plate in close contact with the bottom.

The photoelectron conduction tip is formed by vertically stacking graphite, and when photoelectrons are generated in a predetermined area, the photoelectron conduction tip may allow the photoelectrons to be moved to an area, where the photoelectrons are not generated, through the graphite due to a potential difference between a position where the photoelectrons are generated and positions of second ends of the graphite.

The signal wire assembly may include: a central signal wire unit including a central signal wire that has an upper end connected to the bottom of the photoelectron conduction tip inside the photon detector case assembly and a lower end inserted through a central signal hole formed at the center of the base case of the photon detector case assembly, a vacuum nut that is thread-fastened to the central signal wire over the central signal wire hole and fixes the central signal wire to the top of the base case, and a fixing nut that is thread-fastened to the central signal wire under the central signal wire hole and fixes the central signal wire to the bottom of the base case; and a horizontal signal wire unit including a horizontal signal wire terminal through which the central signal wire passes between the bottom of the base case and the fixing nut, and a horizontal signal wire that is connected to the horizontal signal wire terminal through the base case and outputs photoelectrons generated at the photoelectron conduction tip to the outside for analysis.

The photon detector may include an insulating sealing unit including: an upper transparent window sealer that seals the portion between the bottom of the transparent window support flange of the upper case unit of the photon detector case assembly and the edge of the top of the transparent window; a lower transparent window sealer that seals the portions between the top of the insulating cover-upper support flange of the body case unit of the case assembly, the edge of the bottom of the transparent window, and the upper case; a base case hole sealer that seals the portion between the base case hole formed at the center of the base case of the case member and the central signal wire of the signal wire assembly; and a base case sealer that seals the portion between the bottom of the body case unit of the photon detector case assembly and the upper photoelectric transformer groove of the base case, in which the insulating sealing unit seals the inside of the photon detector case assembly.

The insulating sealing unit may seal the inside of the photon detector case in a vacuum state.

The photoelectron conduction tip of an apparatus for detecting photons in accordance with atmospheric conditions, which includes: a photoelectric transformer that is formed by vertically stacking graphite and generating photoelectrons from incident light from the outside; a signal wire assembly that outputs the photoelectrons generated by the photoelectric transformer to a spectrometer; and a photon detector case assembly that has a transparent window transmitting light in the atmosphere to the photoelectron conduction tip and receives the photoelectric transformer, is manufactured by a method including: a graphite manufacturing process that manufacturing graphite by stacking graphene and sintering them at high temperature pressure; a graphite arranging process that stacks the graphite in a direction to function as conductive wires; and a carbon fiber composite manufacturing process that manufactures the photoelectron conduction tip that is a carbon fiber composite by sintering the arranged graphite at high temperature and pressure.

According to another aspect of the present invention, there is provided a method of adjusting light quantity for an apparatus for detecting photons in accordance with atmospheric condition using a function of adjusting light quantity. The method includes: light quantity detecting in which an optical sensor unit of a light quantity adjuster detects quantity of sunlight traveling inside through a light inlet and then outputs a light quantity detection signal to a controller; reference light quantity comparing in which the controller compares predetermined reference light quantity with the quantity of the sunlight detected by the optical sensor unit for detecting photoelectrons to observe atmospheric conditions; light quantity decrease controlling in which when the quantity of the sunlight is equal to or larger than the reference light quantity as the result of comparing in the reference light quantity comparing, the controller decreases the opening formed by the optical shutters by outputting an operation signal for decreasing the size of the opening of the optical shutter unit of the light quantity adjuster to the shutter actuating unit to have light quantity closest to the reference light quantity; and light quantity increase controlling in which when the quantity of the sunlight light is equal to or smaller than the reference light quantity as result of the reference light quantity comparing, the controller increases the opening by outputting an operation signal for increasing the size of the opening of the optical shutter unit of the light quantity adjuster to the shutter actuating unit to have light quantity closest to the reference light quantity.

The light quantity decrease controlling or the light quantity increase controlling may be configured to control the shutter actuating unit such that the diameter of the opening formed by the optical shutters is adjusted within a range of 26~32Φ (mm), the optical shutters are operated at 30 Hz or more, and the diameter is changed by 1Φ (mm) when the opening is controlled in a single step by the optical shutters.

According to the apparatus for detecting photons according to an atmospheric condition, using a function of adjusting light quantity, and the method of adjusting light quantity, it is possible to prevent a rapid change in light quantity by maintaining the quantity of light such as sunlight traveling inside in photon detection within a predetermined error range, so noise in a spectrum for analysis is minimized. Accordingly, reliability in the result of observation is considerably improved.

Further, according to the apparatus for detecting photons, it is possible to prevent light such as diffused light except for the light to be measured, to obtain electrons over work function generated by reaction between the photons in the incident light and substances, and to minimize interference due to external contaminants, foreign substances, and moisture by keeping the inside of the photon detector vacuum; therefore, reliability when incident light is transformed into electric signals and analyzed is significantly improved. Further, it is possible to directly analyze incident light using electric signals without a specific optical interferometer, so it is possible to considerably reduce the size of a spectrometer.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE PRESENTLY PREFERRED EMBODIMENTS OF THE INVENTION

Hereinafter, the present invention will be described in detail with reference to the accompanying drawings showing embodiments of the present invention.

Further, in describing the present invention, detailed descriptions of well-known functions or configurations relating to the present invention will not be provided so as not to obscure the description of the present invention with unnecessary details.

Reference will now be made in detail to various embodiments of the present invention, specific examples of which are illustrated in the accompanying drawings and described below, since the embodiments of the present invention can be variously modified in many different forms. However, it should be understood that embodiments according to spirit of the present invention are not limited to the specific embodiments, but include all modifications, equivalents, and substitutions included in the spirit and the scope of the present invention.

It should be understood that when one element is referred to as being "connected to" or "coupled to" another element, it may be connected directly to or coupled directly to another element, or be connected to or coupled to another element having the other element intervening therebetween. On the other hand, it is to be understood that when one element is referred to as being "connected directly to" or "coupled directly to" another element, it may be connected to or coupled to another element without the other element intervening therebetween. Further, other expressions describing the relationships of components, that is, "between" and "directly between", or "close to" and "directly close to" should be understood in the same way.

Terms used in the present specification are used only in order to describe specific exemplary embodiments rather than limiting the present invention. As used herein, the singular forms are intended to include the plural forms as well, unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Figure 1:
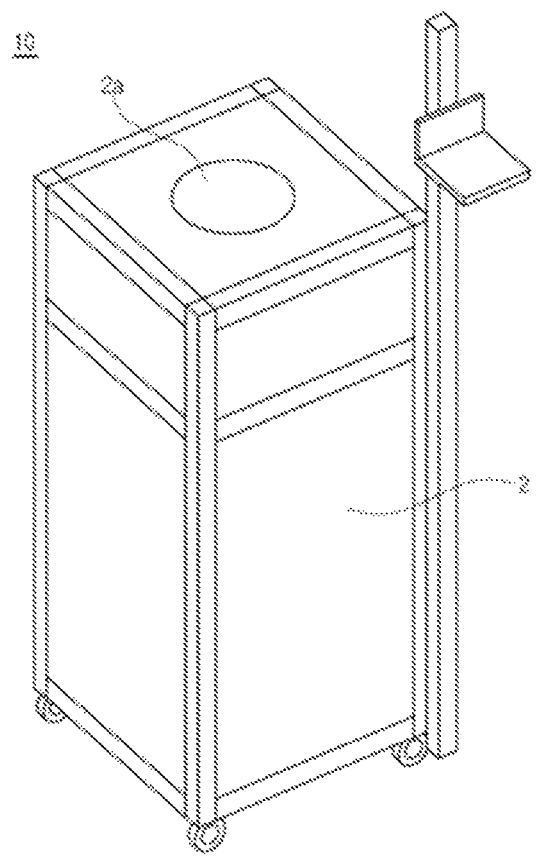
FIG. 1 is a perspective view of an apparatus for detecting photons according to conditions of the atmosphere using a function of adjusting light quantity according to an embodiment of the present invention.
Figure 2:
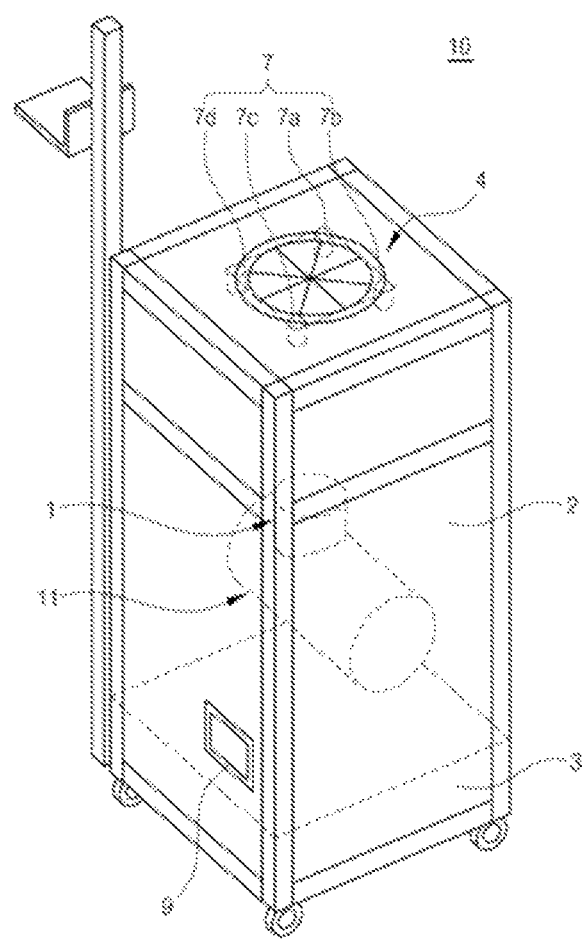
FIG. 2 is a cross-sectional view showing the internal configuration of the apparatus for detecting photons shown in FIG. 1 according to an embodiment of the invention.
Figure 3:
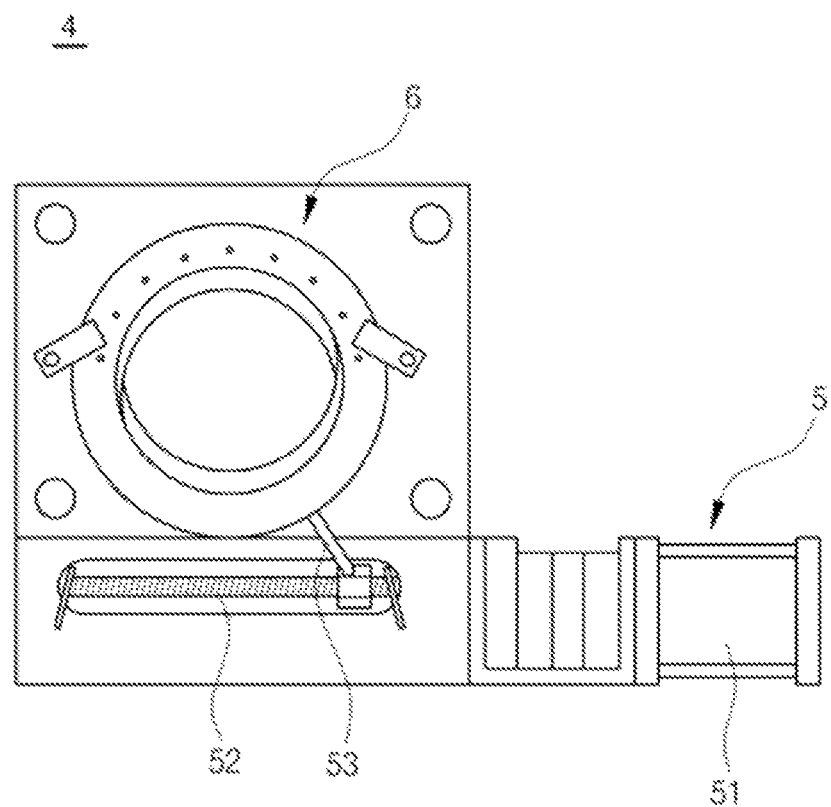
FIG. 3 is a view showing the configuration of a light quantity adjuster according to an embodiment of the invention.

FIG. 1 is a perspective view of an apparatus for detecting photons according to conditions of the atmosphere using a function of adjusting light quantity according to an embodiment of the present invention, FIG. 2 is a cross-sectional view showing the internal configuration of the apparatus for detecting photons shown in FIG. 1, and FIG. 3 is a view showing the configuration of a light quantity adjuster.

As shown in FIGS. 1 and 2, the apparatus 10 for detecting photons includes an apparatus case 2 having a light inlet 2a formed through the center of the top, a light quantity adjuster 4 disposed under the light inlet 2a, a photon detector 1 disposed under the light quantity adjuster 4, a controller 3 controlling operation of the light quantity adjuster 4 to adjust the quantity of light such as sunlight, a display unit 9 displaying an operation state of the apparatus 10 for detecting photons and allowing a user to input control instructions, and a spectrometer 11 performing spectroscopic analysis by performing Fourier analysis on signals of photoelectrons detected by the photon detector 1.

Figure 4:
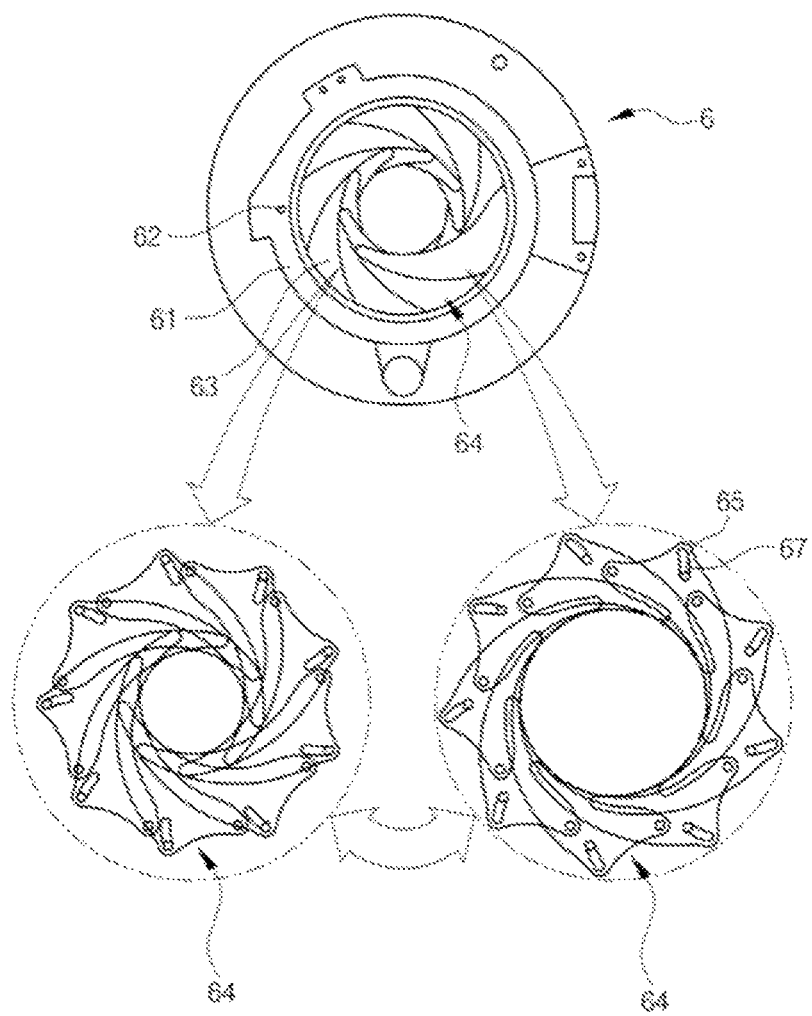
FIG. 4 is a view showing the configuration of an optical shutter unit according to an embodiment of the invention.

As in FIGS. 2 to 4, the light quantity adjuster 4 includes a shutter actuating unit 5 controlling operation of an optical shutter 64, an optical shutter unit 6 operated to change the diameter of an opening to adjust the quantity of incident light by the shutter actuating unit 5, and an optical sensor unit 7 detecting and transmitting the quantity of incident light to the controller 3.

The shutter actuating unit 5 includes stepping motor 51 changing the diameter of the opening of the optical shutter unit 6 in a predetermined unit, a screw bolt 51 coupled to the stepping motor 51, and a shutter actuating rod 53 coupled to the screw bolt 52 at an end and rotating a rotary ring 61 of the optical shutter unit 6, which will be described below, by moving forward or backward in accordance with the rotational direction of the screw bolt 52. The end of the shutter actuating rod 53 coupled to the screw bolt 52 may be a ball joint (not shown) so that the shutter actuating rod 53 can be easily changed when it is moved forward and backward. The stepping motor 51 may operate the optical shutter at 30 Hz or more and increase or decrease the diameter of the opening of the optical shutter unit 6 by 1Φ (mm) for each rotation of one step. Accordingly, a change rate of light quantity to a change in size of the opening is minimized, interference with the optical analysis of an FTS does not occur, and incident light such as sunlight is stably transmitted, so saturation of signals according to intensity of light is prevented.

The optical shutter unit 6 includes the rotary ring 61 and the optical shutter 64 in which the diameter of the opening is changed by the rotary ring 61.

The rotary ring 61 has a shutter actuating rod hole 62 in which an end of the shutter actuating rod 53 is hinged-coupled and has actuating pins 65 formed with regular angles to be inserted in oblong holes 67 formed in each shutter 63 of the optical shutter 64.

The optical shutters 64 include a plurality of shutters 63 that each has an oblong hole in which the actuating pins are inserted and change the diameter of the opening by rotating when the actuating pins are moved with rotation of the rotary ring. The diameter of the opening of the optical shutter 64 is adjusted within 26~32Φ (mm) in accordance with the rotational angle of the rotary ring 61, so it is possible to keep the quantity of light uniform with a difference of 1 (px*ms) or less. This is for minimizing a change rate of light quantity to a change in size of the opening, removing interference with optical analysis of an FTS, and preventing saturation of signals according to intensity of light by stably transmitting incident light such as sunlight.

That is, one aspect of the present invention is to control the optical shutter unit 60 so that incident light can be stably transmitted, so the optical shutter unit 6 may be C-mount motorized shutter by Edmund Optics and the structure is not described in detail.

The optical sensor unit 7 includes a plurality of optical sensors 7a to 7d arranged with regular intervals around the light quantity adjuster 4 under the light inlet 2a of the apparatus case 2 and detecting and outputting the quantity of light traveling inside through the light inlet 2b to the controller 3.

Figure 5:
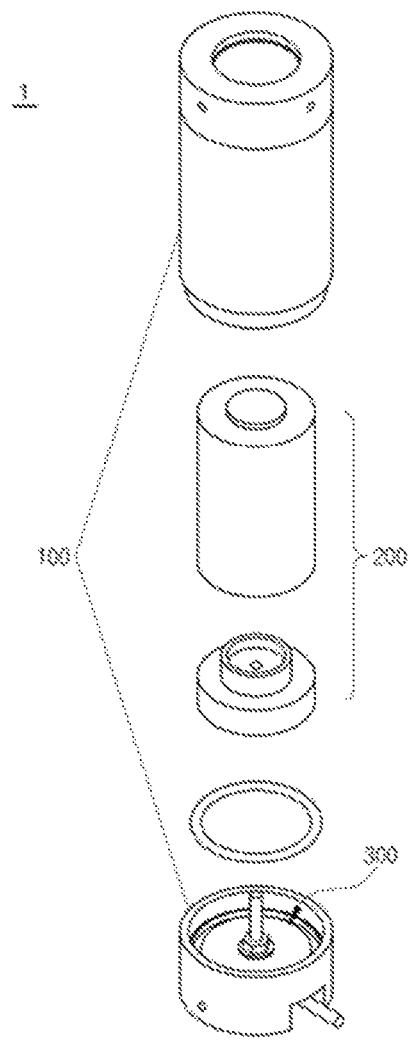
FIG. 5 is an exploded perspective view a photon detector according to an embodiment of the invention.
Figure 6:
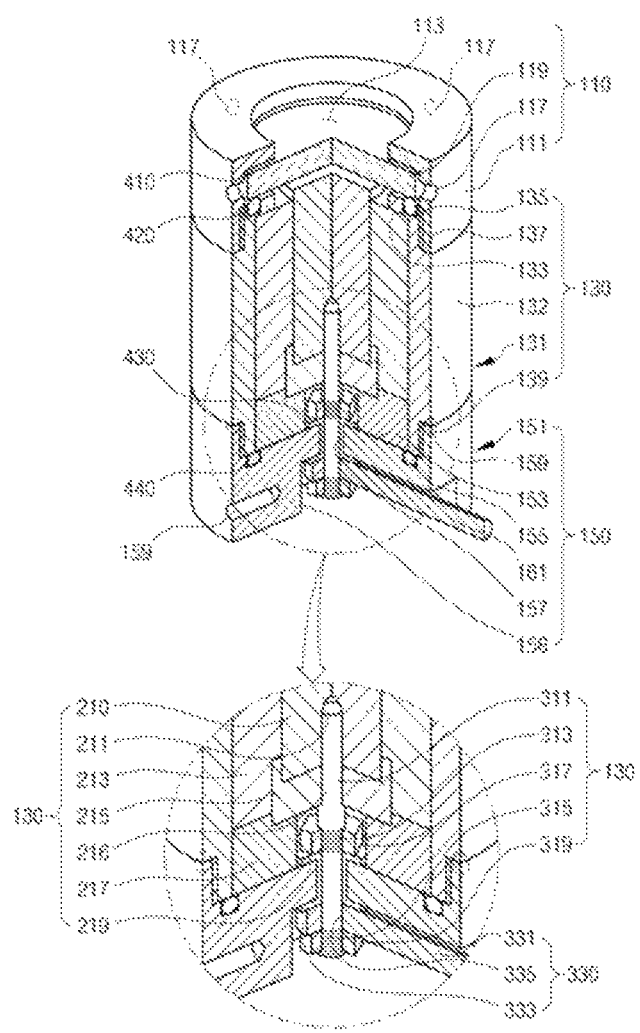
FIG. 6 is a cross-sectional view showing the assembly of the photon detector shown in FIG. 5 according to an embodiment of the invention.

FIG. 5 is an exploded perspective view a photon detector 1, and FIG. 6 is a cross-sectional view showing the assembly of the photon detector 1 shown in FIG. 5.

As shown in FIGS. 5 and 6, the photon detector 1 includes a photon detector case assembly 100, a photoelectric transformer 200, a signal wire assembly 300, and an insulating sealing unit 400.

The photoelectric transformer 200 and the signal wire assembly 300 are combined to generate photoelectrons using light in the atmosphere and then output them to an analyzer such as the spectrometer 11 and are then mounted in the photon detector case assembly 100. The insulating sealing unit 400 seals the portions between cases of the photon detector case assembly 100, the joint between the photoelectric transformer 200 and the photon detector case 100, and the joint between the signal wire assembly 300 and the photon detector case so that the inside of the photon detector 1 is kept hermetic under a vacuum state, in order to prevent reduction of photoelectron detection efficiency due to reduction of photoelectric transformation efficiency by moisture or foreign substances such as dirt flowing inside and interfering with generation of photoelectrons. The degree of vacuum in the photon detector case assembly 100 may be low, 0.1 hpa~100 hpa.

To this end, the insulating sealing unit 400 has a strength high enough to keep the inside of the photon detector case assembly 100 under a vacuum in order to protect the photoelectron conduction tip 210 that functions as an optical sensor from interference due to water, dust, and chemical reactions by completely isolating the inside and the outside and to allow the photoelectron conduction tip 210 to stably transmit signals.

The photon detector case assembly 100, the photoelectric transformer 200, the signal wire assembly 300, and the insulating sealing unit 400 of the photon detector 1 and their combination relationships are described hereafter in detail with reference to FIG. 6.

As shown in FIG. 6, the photon detector case assembly 100 includes an upper case unit 110, a body case unit 200, and a base case unit 300. The photon detector case assembly 100 may be made of a material having high durability and corrosion resistance such as stainless steel.

The upper case unit 110 includes an upper case 111 formed in a cylindrical shape having a light inlet 113 over the top of the photoelectron conduction tip 210 of the photoelectric transformer 400, with the bottom open, and a transparent window 119 mounted over the light inlet 113 to transmit only light within a predetermined range of angles from the direction perpendicular to the light inlet 113.

The light inlet 113 having an inner diameter smaller than the outer diameter of the transparent window 119 is formed through the center of the top of the upper case 110 and the entire top is a transparent window support flange 115 supporting the top of the transparent window 119.

A plurality of upper grounding terminals 117 for grounding the photon detector 1 protrudes outward around the upper case 111. Four upper grounding terminals 117 are shown in FIG. 6, but the number is not limited.

The transparent window 119 isolates the inside and outside of the photon detector case assembly 100 and transmits light within a predetermined range of angles in the atmosphere. Since the transparent window 119 transmits only the light within a predetermined range of angles from the direction perpendicular to the top of the photoelectron conduction tip 210, it is possible to increase photoelectron emission efficiency and keep light quantity uniform. To this end, the transparent window 119 may be a crystal window made of crystal that transmits only light having an incident angle of 70 to 90 degrees to the transparent window 119 for the structural features of crystal.

The body case unit 130 includes a body case 131. The body case 131 is formed in the shape of a pipe with the top and bottom open. In FIG. 6, the body case 131 is formed in a cylindrical pipe, but it is not limited to the cylindrical pipe, that is, it may be formed in a polygonal pipe.

The body case unit 130 includes a body case 131. An insulating cover-upper end support flange 133 that protrudes toward the center of the cylindrical pipe to support the edge of the bottom of the transparent window 119 and the top of the insulating cover 213 is formed around the inner side of the upper end of the body case 131. A lower transparent window sealer seat 135 that is a circular groove, where an upper transparent windows sealer 410 is seated to hermetically seal the portions between the edge of the bottom of the transparent window 119, the top of the insulating cover-upper end support flange 133, and the upper case 111, is formed on the top of the insulating cover-upper end support flange 133.

An upper case coupling step 137 having an outer diameter smaller than the outer diameter of the body case 131 in a predetermined section under the insulating cover-upper end flange 133 is formed on the outer side of the body case 131 to fit the bottom of the upper case 111 so that the upper case 111 can be inserted in the outer side of the upper portion of the body case 131. Further, a base case-coupling step 139 protruding at the bottom at a predetermined distance and having an outer diameter smaller than the outer diameter of the body case 131 is formed on the outer side of the body case 131 in a predetermined section upward from the bottom of the body case 131 so that the base case 151 can be inserted in the outer side of the lower portion of the body case 131.

The base case 150 is coupled to the bottom of the body case unit 130 to fix and support the body case unit 130, the photoelectron transformer 200, and the signal wire assembly 300 and keep the inside of the photon detector 1 vacuum. To this end, the base case unit 150 includes a base case 151, which has a bottom case hole 157 formed through the center such that the lower end of a central signal wire 311 is exposed to the outside, and has a photoelectric transformer seat 153 where the photoelectric transformer 200 is seated.

A base case outer wall 156 having an inner diameter and an outer diameter corresponding to the inner side and the outer side of the base case-coupling step 139 and protruding vertically in the shape of a cylindrical pipe is formed around the top of the photoelectric transformer seat 153. A ring-shaped base case sealer seat 155 is formed around the top of the photoelectric transformer seat 153, which includes a portion overlapping a predetermined portion of the bottom inside the outer wall 156 of the base case, at a predetermined depth at a predetermined portion jointed to the inner lower end of the base case outer wall 156. A base case bottom groove 158 where a horizontal signal wire terminal 333 and a fixing nut 319 are inserted is formed on the bottom of the base case 151. A plurality of lower grounding terminals 159 is formed with regular intervals around the outer side of the base case 151. Further, a horizontal signal wire hole 161 is formed through the outer side of the base case 151. The horizontal signal wire 331 of the signal wire assembly 300 is connected to the horizontal signal wire terminal 333 through the horizontal signal wire hole 161.

The photoelectric transformer 200 includes: a photoelectron conduction tip 210 that is a carbon fiber composite configured by a photosensitive sensor detecting light by generating photoelectrons from incident light using a plurality of vertically stacked graphite; a conductive plate 215 that is a copper plate coupled to the bottom of the photoelectron conduction tip 210; an insulating cover 213 that disposed on the outer side of the photoelectron conduction tip 210 and the copper plate 215 that are combined, to insulate them from the photon detector case assembly 100 and support and fix the photoelectron conduction tip 210 and the conductive plate 215; and an insulating base 217 supporting the photoelectron conduction tip 210, the conductive plate 215, and the insulating cover 213 under them.

The photoelectron conduction tip 210 is a carbon fiber composite that generates photoelectrons having energy corresponding to energy over a work function due to inflow light energy and moves the photoelectrons to the opposite side of the area where the photoelectrons are generated, when light such as sunlight in the atmosphere travels inside.

Figure 7:
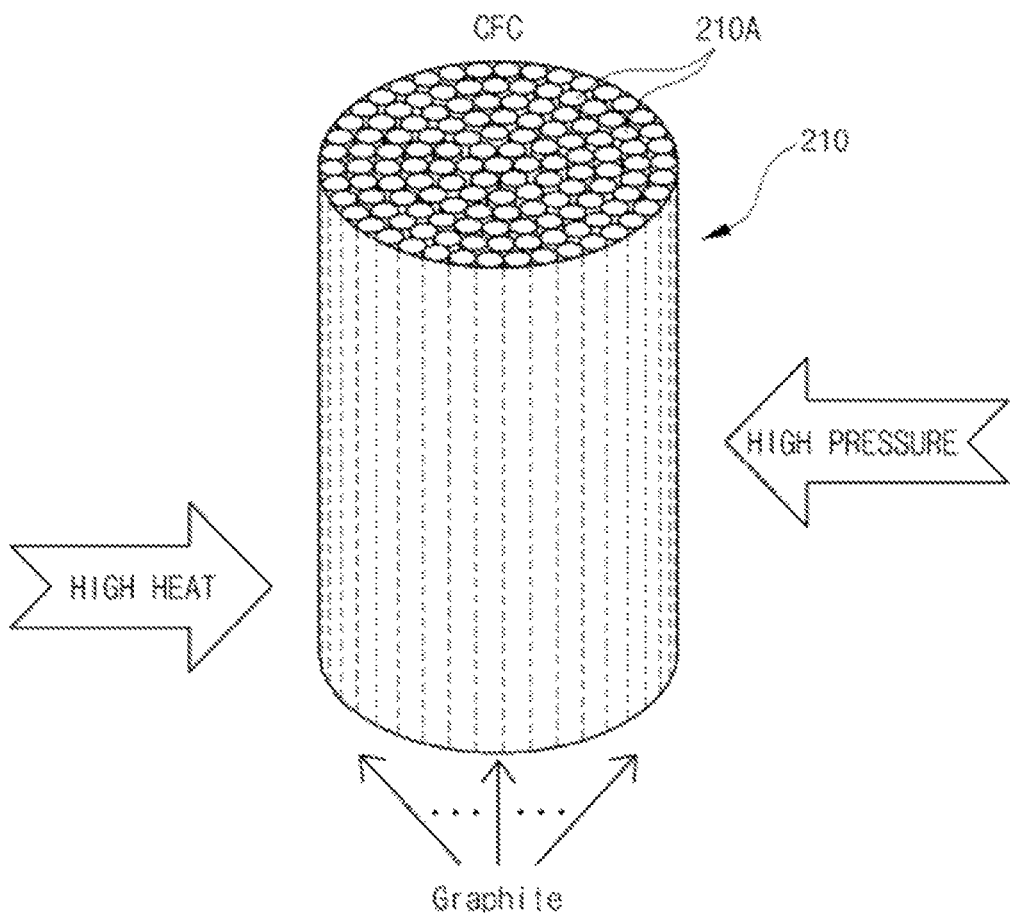
FIG. 7 is a view showing an arrangement of graphite in a photoelectron conduction tip and a process of manufacturing and the photoelectron conduction tip according to an embodiment of the invention.
Figure 8:
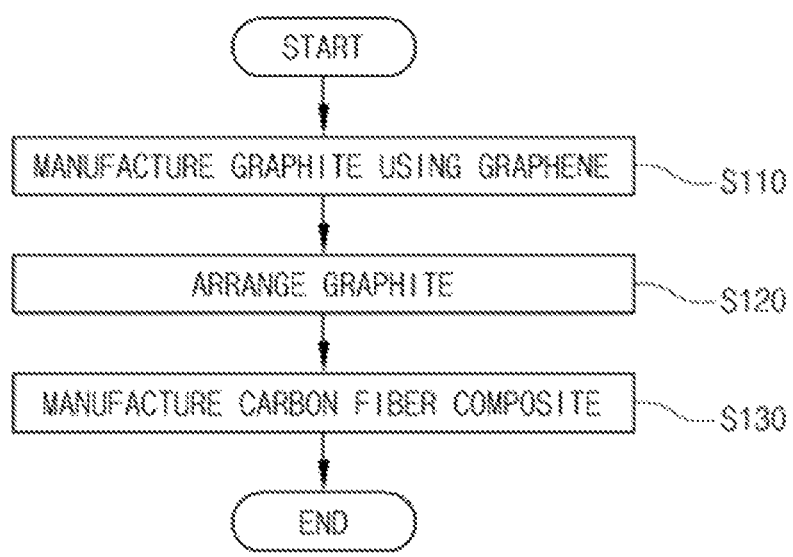
FIG. 8 is a flowchart illustrating a method of manufacturing a photoelectron conduction tip according to an embodiment of the invention.

FIG. 7 is a view showing an arrangement of graphite 210A in a photoelectron conduction tip 210 and a process of manufacturing and the photoelectron conduction tip 210 and FIG. 8 is a flowchart illustrating a method of manufacturing a photoelectron conduction tip.

The structure of the photoelectron conduction tip 210 and a manufacturing process thereof are described hereafter with reference to FIGS. 7 and 8.

As shown in FIG. 7, the photoelectron conductive tip 210 has a structure in which graphite 210A us vertically arranged so that photoelectrons generated from incident light naturally move down (to the area opposite to the area where the photoelectrons are generated). According to this structure, when a photoelectron is generated at an upper portion from light flowing inside from the outside, a potential difference is generated between the photoelectron generated at the upper portion and a lower portion and the graphite 210A function as conductive wires carrying the photoelectron downward, so the photoelectron quickly moves to the lower portion of the photoelectron conduction tip 210 and accordingly the probability of the photoelectron reentering an electron orbit is reduced, thereby minimizing a loss of the photoelectron.

In order to manufacture the photoelectron conduction tip 210 having the structure described above, graphite us manufactured by exposing graphene to high temperature and high pressure. For example, a graphite is formed by stacking graphene of $C_{19}$ in several layers and then exposing them at about 2000☐ under 100 to 200 atmospheric pressure for about two weeks (S110: Graphite manufacturing process).

Thereafter, the graphite is stacked in a predetermined direction. Graphite as vertically stacked in an embodiment of the present invention (S120: Graphite arranging process).

The photoelectron conduction tip 210 that is a carbon fiber composite (CFC) in which graphite 210A is arranged in layers in a predetermined direction by exposing the graphite 210A to high temperature (about 1000☐) and high pressure (100atm) after stacking them in a predetermined direction.

The carbon fiber composite has a Dirac point that a D+G band where a D-band and a G-band overlap each other in Raman spectrum, as a region where valance band and a conductive band that carbon atoms have, so a region with zero electric resistance is generated and electrons move at high speed.

The physical properties of the photoelectron conduction tip 210 that is a carbon fiber composite manufactured as described above can be compared with those of copper as follows.

Charge mobility $cm_2/(v*sec)$, allowable current density $(A/cm^2)$, surface resistance $(\Omega S)$, and band gap (eV) that are electric properties were respectively 200,000 $cm^2/(v*sec)$ that is 150 times that of copper, $5*10^8$ $A/cm^2$ that is 100 times that of copper, 50 $\Omega S$ or less that is under 35% of that of copper, and 1,100 eV that is 1.11 times that of silicon; strength (Gpa) and softness/elasticity that are mechanical properties were 1100 Gpa that is 200 times that of copper and 1 to less than 5% or 20% of a circle area; and thermal conductivity (W/mK) that is a thermal property was 5,000 W/mK that is 1.5 times that of a carbon nano tube (CNT).

The photoelectron conduction tip 210 having the structure and properties described above is shown in a cylindrical shape in FIGS. 6 and 7, but it may be formed in various shapes including polygonal cylindrical shape.

Referring to FIG. 6 again, the photoelectron conduction tip 210 has a central signal wire groove 211 formed on the bottom where the upper end of the central signal wire 311 of the signal wire assembly 300 is inserted to be able to send photoelectrons to analyzer such as the spectrometer 11.

The conductive plate 215 is a conductive plate made of copper and has a conductive plate hole 216 connected with the central signal wire groove 211 at the center and is coupled to the bottom of the photoelectron conduction tip 210. As described above, the conductive plate 215 functions as a conductive wire for carrying photoelectrons moved to the bottom of the photoelectron conduction tip 210 by the graphite 210A to the central signal wire 311.

The insulating base 217 is a plate having an outer diameter corresponding to the outer diameter of the insulating cover 213. The central signal wire 311 has a vacuum nut hole 219 formed through the center through which the central signal wire 311 passes and in which a vacuum nut 219 for fixing the central signal wire 311 by being thread-fastened to the central signal wire 311 is seated.

The insulating base 217 is seated in the photoelectric transformer seat 153 and fixes and supports the assembly of the photoelectron conduction tip 210, the conductive plate 215, and the insulating cover 213 inside the photon detector case assembly 100.

The insulating cover 213 and the insulating base 217 may be an insulating boron cover and an insulating boron base.

The signal wire assembly 300 may include a central signal wire unit 310 carrying photoelectrons generated by the photoelectron conduction tip 210 to the lower portion of the photon detector case assembly 100 and the horizontal wire unit 330 transmitting photoelectrons from the central signal wire unit 310 to an analyzer such as the spectrometer 11.

The central signal wire unit 310 includes the central signal wire 311, the vacuum nut 317, and the fixing nut 319.

The central signal wire 311 is a bolt-shaped conductive member that is inserted in the base case hole 157 of the base case 151, the vacuum nut hole 219 of the insulating base 217, and the conductive plate hole 216 of the conductive plate 215, with the upper end inserted in the central signal wire groove 211 formed on the bottom of the photoelectron conduction tip 210.

A vacuum male bolt 313 to which the vacuum nut 317 is thread-fastened is formed at the portion of the outer side of the central signal wire 311 which is positioned at the vacuum nut hole 219. A fixing nut male bolt 315 thread-fastened to the fixing nut 319 is formed at the outer side where the fixing nut 319, which is positioned in the base case bottom groove 158 formed on the bottom of the base case 151, is coupled. The vacuum nut male bolt 313 and the fixing nut male bolt 315 have pitches in opposite directions, so when the vacuum nut 317 or the fixing nut 319 are rotated to be loosened or tightened with respect to the central signal wire 311, they do not influence the thread-fastening of each other, and accordingly, they can be easily thread-fastened to the central signal wire 311.

The horizontal signal wire unit 330 includes the horizontal signal wire 331 and the horizontal signal wire terminal 333.

The horizontal signal wire 331 may be formed in a conductive bolt as a terminal to which a signal wire for carrying photoelectrons from the central signal wire 311 to the spectrometer 11 is connected.

The horizontal signal wire terminal 333, which electrically connects the central signal wire 311 and the horizontal signal wire 331, is a plate having a terminal hole 335 at the center through which the central signal wire 311 is inserted and having an outer diameter corresponding to the inner diameter of the base case bottom groove 158. A male thread is formed around the outer side of the horizontal signal wire terminal 333 and a female thread is formed around the inner side of the base case bottom groove 158, so the horizontal signal wire 333 can be thread-fastened to the base case bottom groove 158.

The insulating sealing unit 400 includes an upper transparent window sealer 410, a lower transparent window sealer 420, a base case hole sealer 430, and a base case sealer 440.

The upper transparent window sealer 410 is a ring-shaped rubber sealer plate to be in close contact with the bottom of the transparent window support flange 115 and the edge of the transparent window 119 so that the portion between the bottom of the transparent window support flange 115 and the edge of the top of the transparent window 119 can be sealed.

The lower transparent window sealer 420 is a cylindrical sealer made of an insulating material such as rubber in a ring shape. The lower transparent window sealer 420 having the structure described above is seated in a lower transparent window sealer hole 135 formed at the insulating cover-upper end support flange 133 of the body case 131 and seals the joints between the top of the insulating cover-upper end support flange 133, the edge of the bottom of the transparent window 119, and the upper case 111.

The base case hole sealer 430 is made of a circular H-shaped Teflon having an H-shaped cross-section to be able to seal the portion between the base case hole 157 and the central signal wire 311. The base case hole sealer 430 having the configuration described above seals the portion between the base case hole 157 and the central signal wire 311 by being inserted in the base case hole 157.

The base case sealer 440 is also made of a sealing member such as rubber in a ring shape. The base case sealer 400 having the configuration describe above seals the portion between the body case 131 and the base case 151 by being inserted in the base case sealer seat 155.

Next, a process of assembling the photon detector 1 and operation for adjusting light quantity are described.

In order to assemble the photon detector 1, the base case hole sealer 430 is inserted into the base case hole 157 and then the horizontal signal wire terminal 333 is seated in the base case bottom groove 158. Thereafter, the central signal 311 is disposed through the terminal hole 335 and the center of the base case hole sealer 430. Further, the vacuum nut 317 is coupled to the upper protrusion of the base case 151 of the central signal wire 311 and the lower end of the central signal wire 311 at the base case bottom groove 158 is fixed by the fixing nut 319. The central signal wire 311, the vacuum nut 317, and the fixing nut 319 have female threads in opposite directions and the male threads at the coupling positions of the central signal wire 311 are formed in opposite directions. Accordingly, when any one of the vacuum nut 317 and the fixing nut 319 is tightened or loosened, it does not influence the thread-fastening of the other one.

Thereafter, the base case sealer 440 is seated in the base case sealer seat 155.

Next, the conductive plate 215 is coupled to the bottom of the photoelectron conduction tip 210 and the insulating cover 213 is fitted on the assembly of the conductive plate 215 and the photoelectron conduction tip 210. Thereafter, the body case 131 is fitted on the assembly of the photoelectron conduction tip 210, the conductive plate 215, and the insulating cover 213 by fitting the body case 131 onto the assembly of the photoelectron conduction tip 210, the conductive plate 215, and the insulating cover 213 from above. Thereafter, the insulating base 217 is inserted inside the body case 131 through the bottom of the body case 131 to be positioned on the bottom of the conductive plate, thereby completing combination of the body case 131 and the photoelectric transformer 200.

Thereafter, the photoelectric transformer 200 is seated in the photoelectric transformer seat 153 by coupling the body case 131 to the base case 151 by seating it into the photoelectric transformer seat 153 of the base case 151 such that the bottom of the base case 131 is positioned on the top of the base case sealer 440 of the base case sealer seat 155. In this process, the upper end of the central signal wire 311 is inserted into the central signal wire groove 211 through the conductive plate hole 216.

Next, the lower transparent widow sealer 420 is inserted into the lower transparent window sealer seat 135, the transparent window 119 is seated on the lower transparent window sealer 420, the upper transparent window sealer 410 is seated on the top of the transparent window 119, and the upper case 111 is hermetically combined with the body case 131.

Next, the horizontal signal wire 331 is connected to the horizontal signal wire terminal 333 through the horizontal signal wire hole 161 of the base case 151. The horizontal signal wire 331 and the horizontal signal wire terminal 333 can be thread-fastened.

This assembly process may be performed under a vacuum state, or the inside is made vacuum by forming a specific air discharge hole and the making the inside vacuum after assembling. The vacuum degree may be low, 0.1 hpa~100 hpa. The vacuum state is maintained by the insulating sealing unit 400.

As described above, by making the inside of the photon detector case assembly 100 vacuum, the inside of the photon detector case assembly 100 is isolated from the outside. Accordingly, external moisture, dist, and chemical substances cannot enter into the photon detector case assembly 100, so it is possible to prevent a chemical reaction by external moisture, dust, and chemical substances. Accordingly, it is possible to prevent signal interference due to an unexpected chemical reaction at the photoelectron conduction tip 210 and prevent damage to the photoelectron conduction tip 210.

The operation of the photon detector 1 having the configuration described above is described hereafter. When light in the atmosphere such as sunlight travels inside through the light inlet 113, the transparent window 119 transmits the light and the light travels to the top of the photoelectron conduction tip 210. The light such as sunlight reaching the top of the photoelectron conduction tip 210 supplies energy at a predetermined level corresponding to a work function for emitting electrons to an electron cloud of carbon atoms of the photoelectron conduction tip 210 and separates electrons having energy over the level. The transparent window 119 is a crystal window and external light is guided perpendicular to the transparent window 119 by a mirror tracing sunlight and a mirror for adjusting an incident angle to be perpendicular to the transparent window 119. The transparent window 119 transmits only the light having an incident angle of 70 to 90 degrees with respect to the photoelectron conduction tip 210 because the its crystal structure. Accordingly, even if incident light perpendicular to the transparent window is dispersed, only the light having an incident light of 70 to 90 degrees with respect to the photoelectron conduction tip 210 is transmitted. The reason of selectively transmitting the light within the range of incident angle is for reducing influence due to dispersion and directly receiving the light to be measured. That is, the light traveling inside through the top of the photoelectron conduction tip 210 always has an incident angle range between 70 to 90 degrees, so photoelectrons are uniformly generated to always reflect the energy of the incident light and sensitively respond to a change in light quantity, thereby considerably improving the performance of the photon detector 1. Accordingly, the photoelectrons generated from the photoelectron conduction tip 210 can reflect the characteristics of the light to be measured at a high ratio.

As described above, when photoelectrons are generated at the upper portion of the photoelectron conduction tip 210, negative potential increases, so the photoelectrons are moved to the lower conductive plate 215 of the photoelectron conduction tip 210 by the vertically arranged graphite 210A.

The photoelectrons moved to the conductive plate 215 is transmitted to the spectrometer 11 through the central signal wire 311, the horizontal signal terminal 333, and the horizontal signal wire 331, and then analyzed therein.

The photon detector 1 of the present invention sensitively responds to a change in light quantity of the photoelectron conduction tip 210, so the performance of the photon detector 1 significantly improved, which is described in more detail with reference to FIG. 9.

Figure 9:
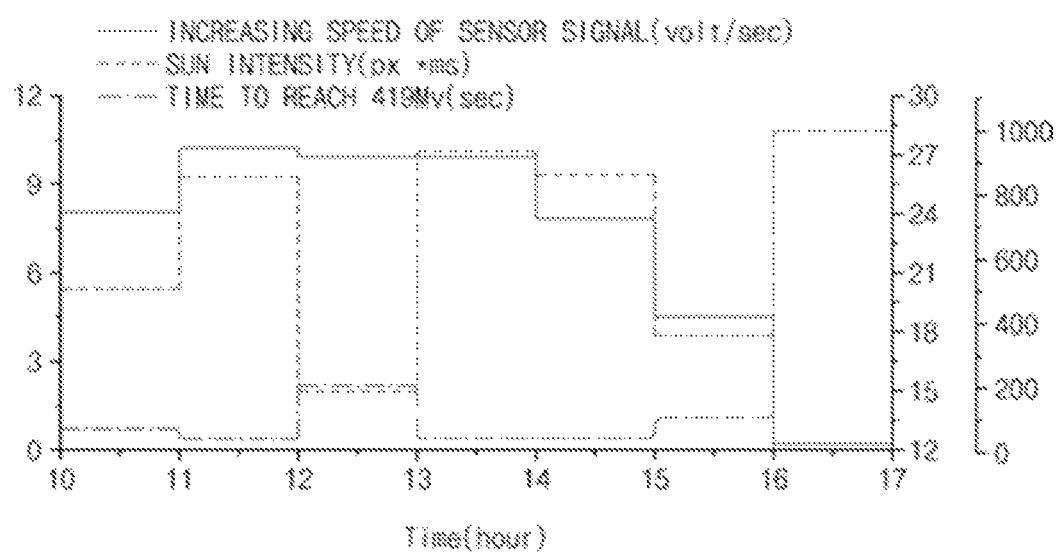
FIG. 9 is a graph showing sensitivity according to light quantity of the photon detector shown in FIG. 5 according to an embodiment of the invention.

FIG. 9 is a graph showing sensitivity according to light quantity of the photon detector 1 shown in FIG. 5.

The sensitivity graph of FIG. 9 shows data of observing cam image sun intensity values of the photon detector 1 and an FTS. As can be seen from the graph, when light intensity in the atmosphere changes with elapse of time, changes by an optical sensor that is the photoelectron conduction tip 210 of the photon detector 1 of the present invention are sensitive, as compared with the intensity of light in the atmosphere, such as sunlight quantity, calculated from a histogram of a cam. This means that it is possible to adjust observation equipment in a very short time through the photoelectron conduction tip 210 and to further increase the quality of the output data. Further, it is possible to expect and prepare for bad weather and an emergency using the photoelectron conduction tip 210, so the equipment can be protected.

The photon detector 1 having the configuration and function described above is mounted such that sunlight traveling inside through the optical shutter 564 from under the light quantity adjuster 4 in the apparatus case 2 travels to the transparent window 119, as in FIGS. 1 and 2.

The function of adjusting light quantity of the apparatus 10 for detecting light quantity with the photon detector 1 mounted, as described above, is described hereafter.

Figure 10:
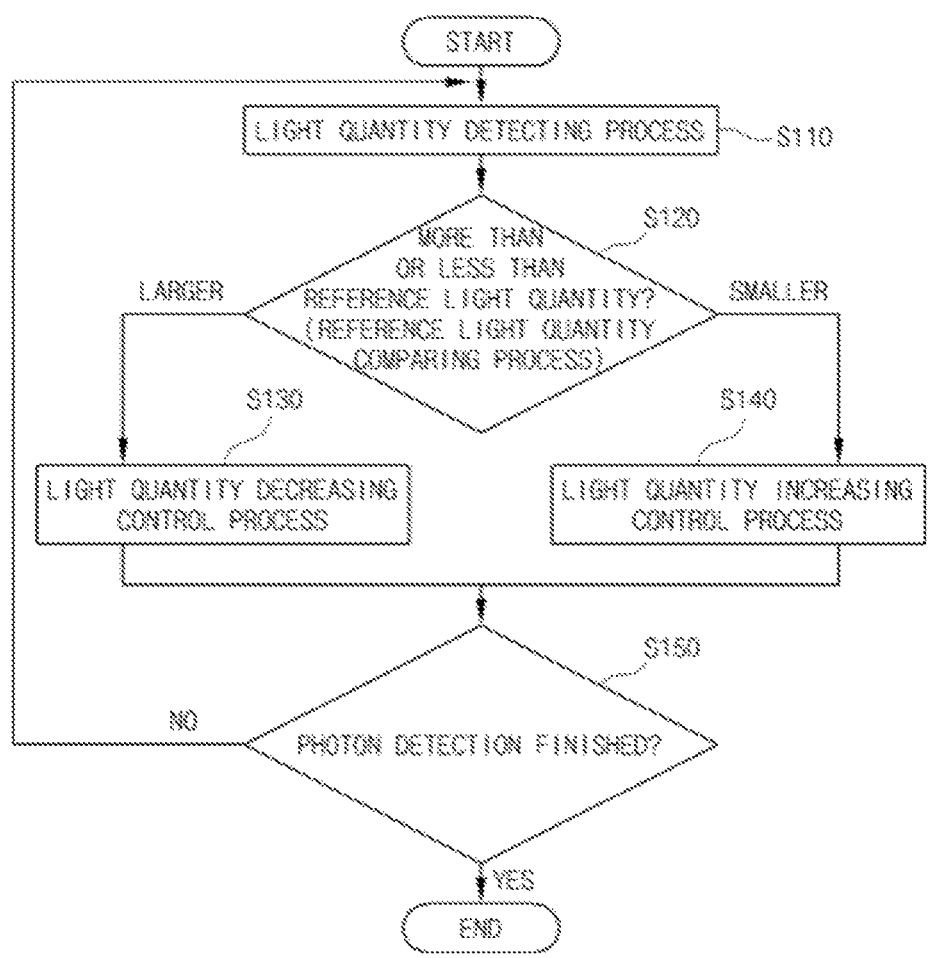
FIG. 10 is a flowchart illustrating a process of a method of adjusting light quantity according to an embodiment of the invention.

FIG. 10 is a flowchart illustrating a process of a method of adjusting light quantity by the apparatus 10 for detecting light quantity of the present invention.

In order to adjust the quantity of incident sunlight using the light quantity adjuster 4, a light quantity detecting process (S110) that detects the quantity of sunlight traveling inside through the light inlet 2a using the optical sensors 7a to 7d of the optical sensor unit 7 of the light quantity adjuster 4 and then outputs a light quantity detection signal to the controller 3 is performed.

The controller 3 receiving light quantity detection signal for the light traveling inside through the light inlet 2a in the light quantity detection process (S110) performs a reference light quantity comparing process (S120) that compares a predetermined reference light quantity with the light quantity detected by the optical sensor unit 7 in order to detect photoelectrons for observation of an atmospheric condition.

When the quantity of the incident light is equal to or larger than the reference light quantity as result of the reference light quantity comparing process (S120), a light quantity decreasing control process (S130) in which the controller 3 decreases light quantity by decreasing the opening formed by the optical shutters 64, by an operation signal for decreasing the size of the opening of the optical shutter unit 6 of the light quantity adjuster 4 to the shutter actuating unit 5 to have light quantity closest to the reference light quantity is performed.

When the quantity of the incident light is equal to or smaller than the reference light quantity as result of the reference light quantity comparing process (S120), a light quantity increasing control process (S140) in which the controller 3 increases light quantity by increasing the opening formed by the optical shutters 64, by outputting an operation signal for increasing the size of the opening of the optical shutter unit 6 of the light quantity adjuster 4 to the shutter actuating unit 5 to have light quantity closest to the reference light quantity is performed.

The light quantity decreasing control process (S130) and the light quantity increasing control process (S140) may be configured to control the shutter actuating unit 5 such that the diameter of the opening formed by the optical shutters 64 is adjusted within a range of 26~32Φ (mm), the optical shutters 64 are operated at 30 Hz or more, and the diameter is change by 1Φ (mm) when the opening is controlled in a single step by the optical shutters 64.

After any one of the light quantity decreasing control process (S130) and the light quantity increasing control process (S140) is performed, as described above, it is determined whether to finish the photoelectron detection work for observing atmospheric conditions. When it is determined to continue the photoelectron detection work, the process returns to the light quantity detection process (S110) and repeats the process, and when it is determined to finish the photoelectron detection work, a photoelectron detection finish determining process for finishing the process is performed (S150).

Figure 11:
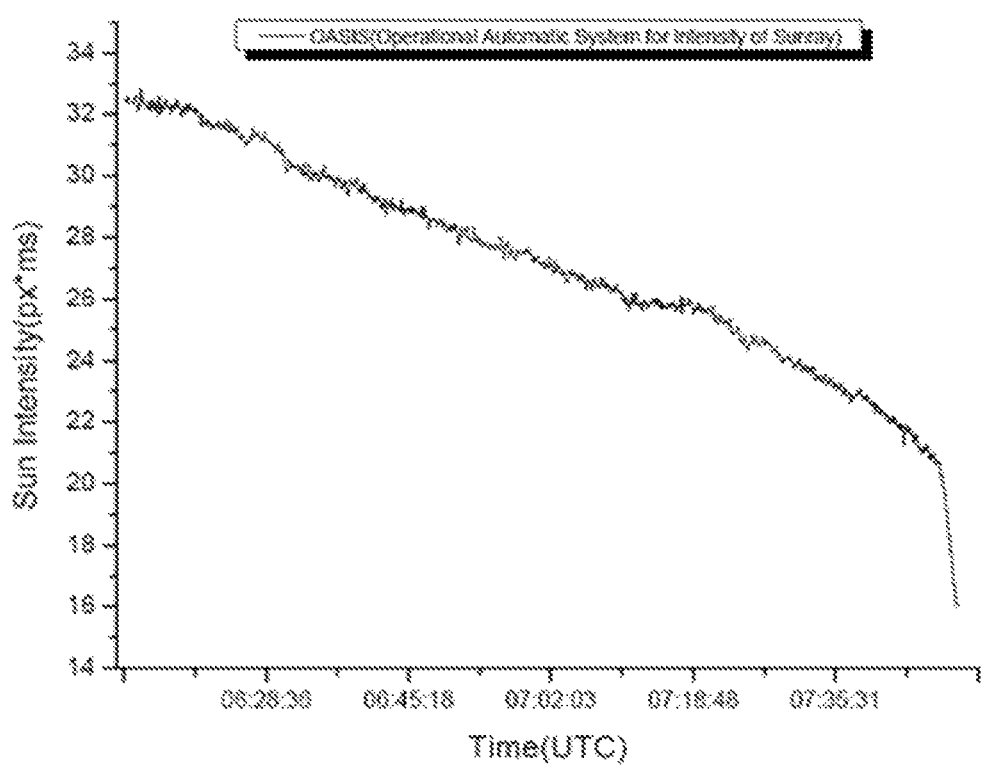
FIGS. 11 and 12 are graphs comparing improvement of photoelectron detection ability by the light quantity adjuster according to an embodiment of the invention.
Figure 12:
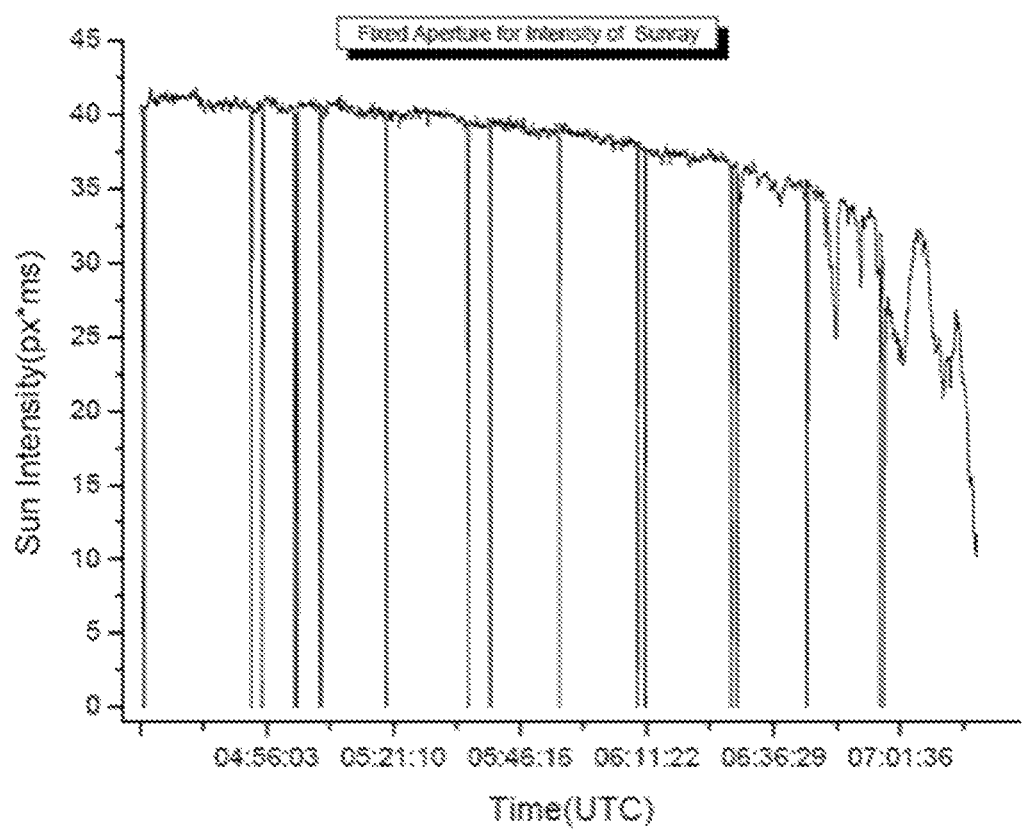

FIGS. 11 and 12 are graphs for comparing improvement of photoelectron detection ability by the light quantity adjuster 4.

FIGS. 11 and 12 compare a light quantity adjustment result by the apparatus 10 for detecting light quantity and the method of adjusting light quantity of the present invention with a light intensity change detection result in a photoelectron detection process in the related art without the light quantity adjuster 4 and the method of adjusting light quantity of the present invention.

As in FIG. 11, when the light quantity adjuster 4 of the present invention is applied, the apparatus 10 for detecting light quantity opens/closes the optical shutters 64 in the range of 26 to 32Φ (mm) on the basis of light quantity information from the optical sensor unit 7 and precisely adjusts light quantity with an error of 1 px*ms or less with the elapse of time. Accordingly, a rapid change in light quantity is prevented, so noise due to a rapid change in light quantity is prevented. Accordingly, reliability and accuracy in the result of observing the atmosphere are considerably improved.

In contrast, according to the result of detecting changes in light intensity by the photoelectron detection process of the related art without the method of adjusting light quantity, as shown in FIG. 12, cases of outputting zero without detecting photoelectrons due to a rapid change in light quantity are frequently shown. The detection value, zero, for photoelectrons acts as noise in an analysis spectrum, so it reduces the accuracy in the result of observing atmospheric conditions, and accordingly, reliability is also rapidly decreased.

The photoelectron conduction tip 210 that is used in the apparatus for detecting photons in accordance atmospheric conditions using a function of adjusting light quantity and a method of adjusting light quantity of the present invention receives sunlight, generates photoelectrons in the minimum and maximum ranges corresponding to the area where the sunlight is radiated, and outputs the electrons using electric signals. The principle of outputting electrons using electric signals is the same as the principle of a superconductor, in which areas with zero electric resistance are generated in a tip due to the physical features of the material and electrons are transmitted through the areas. That is, when a carbon fiber composite that is a stacked structure of carbon fibers is formed for the photoelectron conduction tip 210 by sintering graphene into a stacked structure of graphite, there is a Dirac point that a D+G band where a D-band and a G-band overlap each other in Raman spectrum, as a region where valance band and a conductive band that carbon atoms have. Accordingly, as areas with zero electric resistance such as a superconductor are generated, electrons produced by incident light from the outside such as sunlight are transmitted to the outside without electric resistance. Accordingly, the photoelectron conduction tip 210 of the present invention one-dimensionally provides information without another process or additional equipment such as interferometer, so it can perform a process without distortion of information. Accordingly, the present invention can be used in various industrial fields such as a weather sensor, energy transformation, and the vehicle industry.

Further, according to the apparatus for detecting photons according to an atmospheric condition, using a function of adjusting light quantity, and the method of adjusting light quantity of the present invention, it is possible to remove noise due to a change in light quantity when observing atmospheric conditions, so reliability in the result of observing atmospheric conditions is considerably improved. Accordingly, the apparatus for detecting photons according to an atmospheric condition, using a function of adjusting light quantity, and the method of adjusting light quantity of the present invention can also be used in various industrial fields such as a weather sensor, energy transformation, and a vehicle industry.

When the present invention is applied to the weather sensor field, it may be a foundation for unmanned observation. Further, when the present invention is applied to the energy transformation field, it is possible to provide a new method of transforming energy into electric energy using the configuration and features of substances and carrying the electric energy.

Further, according to the present invention, the sensing speed is high due to low work function and photoelectrons are transmitted with zero electric resistance due to their own potential and the Dirac point of a CFC, so the transmission speed of electrons is high and accordingly the present invention can be used in various industrial fields operating facilities including a photon detector.

What is claimed is:

1. An apparatus for detecting photons in accordance with atmospheric conditions using a function of adjusting light quantity, the apparatus comprising:
   an apparatus case having a light inlet;
   a light quantity adjuster disposed under the light inlet and adjusting quantity of incident light such that a predetermined quantity of light travels inside; and
   a controller controlling operation of the light quantity adjuster in accordance with intensity of light detected by the light quantity adjuster.

2. The apparatus of claim 1, wherein the light quantity adjuster includes:
   a light sensor unit including one or more optical sensors for detecting intensity of light;
   an optical shutter unit changing a diameter of an opening such that a predetermined quantity of light travels inside; and
   a shutter actuating unit controlled by the control unit to open and close the optical shutter unit.

3. The apparatus of claim 2, wherein the optical shutter unit includes:
   a rotary ring having actuating pins symmetrically arranged, and having a shutter actuating rod hole in which an end of the shutter actuating rod is hinged-coupled; and optical shutters including a plurality of shutters that each have an oblong hole in which the actuating pins are inserted and are rotatably arranged with regular intervals around the opening to increase or decrease the diameter of the opening in accordance with rotational directions of the rotary ring.

4. The apparatus of claim 3, wherein the diameter of the opening formed by the optical shutters is adjusted in a range of 26 to 32Φ (mm) in accordance with a rotational angle of the rotary ring, and the optical shutters uniformly maintain quantity of incident light with a difference of 1 (px*ms) or less.

5. The apparatus of claim 2, wherein the shutter actuating unit includes:
a stepping motor controlled by the controller;
a screw bolt coupled to a shaft of the stepping motor; and
a shutter actuating rod having a first end rotatably coupled to the screw bolt and a second end inserted in the shutter actuating rod hole of the rotary ring to rotate the rotary ring, and rotating the rotary ring with rotation of the screw bolt.

6. The apparatus of claim 3, wherein the controller operates the optical shutters at 30 Hz or more and controls the shutter actuating unit such that the diameter is changed by 1Φ (mm) when the optical shutters adjust the opening in a single step.

7. The apparatus of claim 1, further comprising a photon detector that includes:
a photon detector case assembly having a light inlet at one end, having a crystal transparent window that transmits only light having an incident light within a predetermined range with respect to a direction perpendicular to the light inlet, an sealed to prevent inflow of dispersed light or noise light;
a photoelectric transformer having a photoelectron conduction tip that generates photoelectrons from light traveling inside through the light inlet of the photon detector case and sending the photoelectrons to a signal wire assembly; and
the signal wire assembly coupled to the photoelectric transformer and outputting the photoelectrons generated by the photoelectron transformer to the outside for analysis, and
that is disposed under the light quantity adjuster and generates and outputs photoelectrons from light traveling inside through the optical shutters.

8. The apparatus of claim 7, wherein the photoelectric transformer includes:
an insulating cover coupled to the outer side of the photoelectron conduction tip and insulating the photoelectron conduction tip and the photon detector case unit from each other;
a conductive plate coupled to bottoms of the insulating cover and the photoelectron conduction tip and carrying photoelectrons, which are generated by the photoelectron conduction tip and collected around the bottom of the photoelectron conduction tip, to signal wires; and
an insulating base having a vacuum nut hole at a center, in which a vacuum nut is seated and through which the signal wires are inserted, and supporting a bottom of the conductive plate in close contact with the bottom.

9. The apparatus of claim 7, wherein the photoelectron conduction tip is a carbon fiber composite formed by manufacturing graphite by stacking and then sintering graphene at high temperature and pressure, stacking the graphite in a direction so that the graphite functions as conductive wires, and then sintering the graphite at high temperature and pressure, and
when photoelectrons are generated in a predetermined area, the photoelectron conduction tip allows the photoelectrons to be moved to an area, where the photoelectrons are not generated, through the graphite due to a potential difference between a position where the photoelectrons are generated and positions of second ends of the graphite.

10. A method of adjusting light quantity for an apparatus for detecting photons in accordance with atmospheric condition using a function of adjusting light quantity, the method comprising:
light quantity detecting in which an optical sensor unit of a light quantity adjuster detects quantity of sunlight traveling inside through a light inlet and then outputs a light quantity detection signal to a controller;
reference light quantity comparing in which the controller compares predetermined reference light quantity with the quantity of the sunlight detected by the optical sensor unit for detecting photoelectrons to observe atmospheric conditions;
light quantity decrease controlling in which when the quantity of the sunlight is equal to or larger than the reference light quantity as the result of comparing in the reference light quantity comparing, the controller decreases the opening formed by the optical shutters by outputting an operation signal for decreasing the size of the opening of the optical shutter unit of the light quantity adjuster to the shutter actuating unit to have light quantity closest to the reference light quantity; and
light quantity increase controlling in which when the quantity of the sunlight light is equal to or smaller than the reference light quantity as result of the reference light quantity comparing, the controller increases the opening by outputting an operation signal for increasing the size of the opening of the optical shutter unit of the light quantity adjuster to the shutter actuating unit to have light quantity closest to the reference light quantity.

11. The method of claim 10, wherein the light quantity decrease controlling or the light quantity increase controlling is configured to control the shutter actuating unit such that the diameter of the opening formed by the optical shutters is adjusted within a range of 26~32Φ (mm), the optical shutters is operated at 30 Hz or more, and the diameter is changed by 1Φ (mm) when the opening is controlled in a single step by the optical shutters.

* * * * *